Patented July 19, 1932

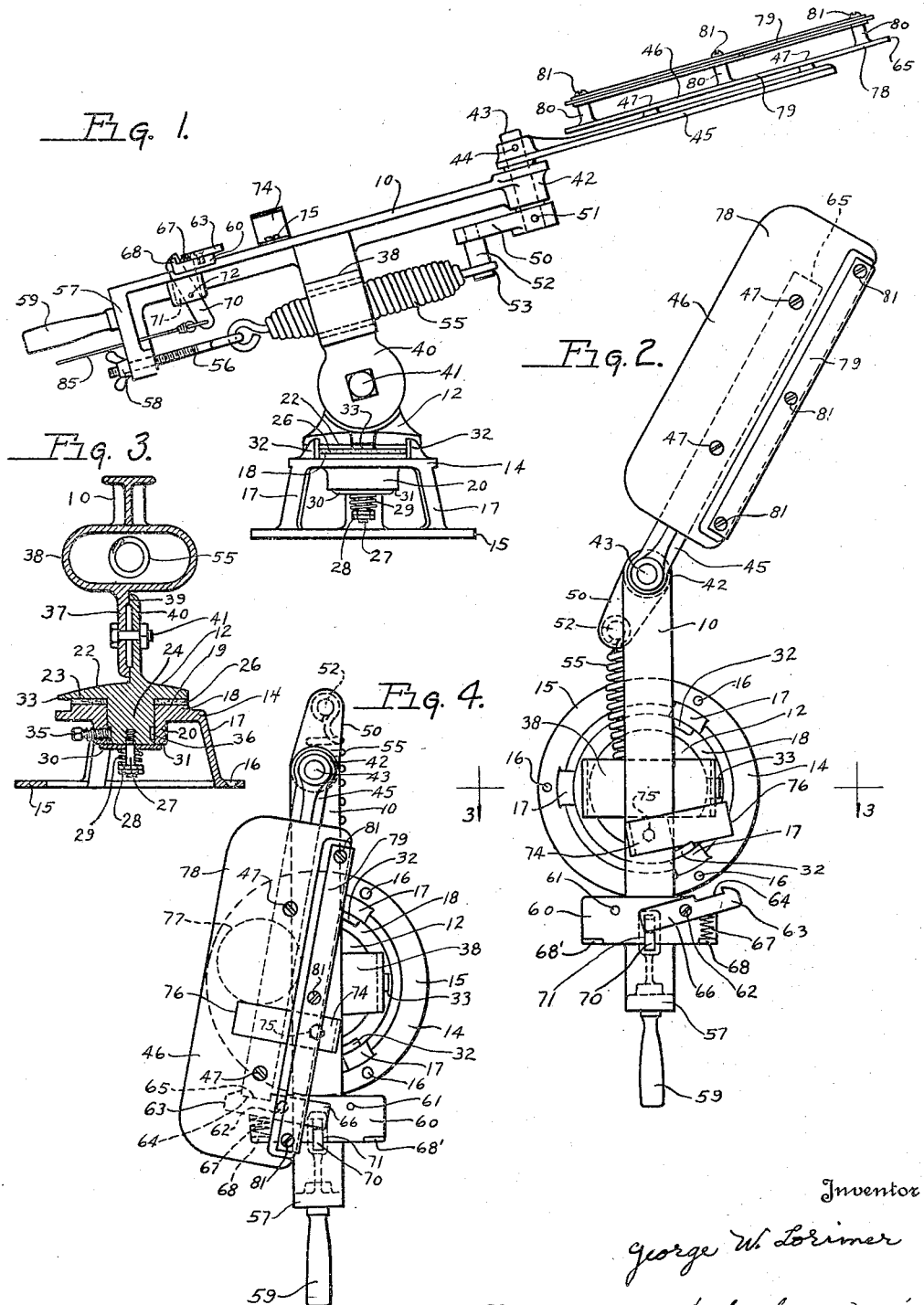

1,867,578

UNITED STATES PATENT OFFICE

GEORGE W. LORIMER, OF TROY, OHIO, ASSIGNOR, BY MESNE ASSIGNMENTS, TO BLACK PRODUCTS COMPANY, OF CHICAGO, ILLINOIS, A CORPORATION OF ILLINOIS

TARGET TRAP

Application filed June 23, 1930. Serial No. 463,153.

This invention relates to target traps.

One of the principal objects of the invention is the provision of a target trap which is of simple, compact construction and may be economically manufactured, and which is readily adapted to throw targets either at varying angles or all in a single line of flight.

Another object of the invention is the provision of a target trap in which parts are provided of symmetrical form to permit reverse assembly of the target throwing mechanism.

A further object of the invention is the provision of a target trap of this character which may be easily and quickly arranged to throw either right-hand or left-hand targets by merely rearranging a few parts of the target throwing mechanism, and without providing a duplication of parts.

Other objects and advantages of the invention will be apparent from the following description, the accompanying drawing and the appended claims.

In the drawing, which discloses a preferred embodiment of the invention—

Fig. 1 is a side elevational view of a target trap constructed in accordance with this invention;

Fig. 2 is a plan view of the trap illustrated in Fig. 1; the trap being arranged to throw right-hand targets;

Fig. 3 is a sectional view taken on the plane of the line 3—3 of Fig. 2; and

Fig. 4 is a plan view of a trap in cocked position; the trap being arranged to throw left-hand targets.

In trap shooting where clay targets are thrown from a trap positioned in the line of shooting and arranged to throw the targets within angular limits substantially within the line of shooting, a conventional trap adapted to throw the usual right-hand targets may be used, and the trap and its attendant may be effectively protected against stray shots by the provision of the usual three sided and covered trap house which is open for discharge of the targets on the side opposite to the shooting stations. Targets are sometimes thrown transversely to the line of shooting, by positioning the trap and its attendant at one side of the shooting stations, and under these circumstances it is frequently necessary to provide an elaborate protecting housing for the trap and trap attendant in order that stray shots may not enter the trap house. For example, a conventional right-hand trap might be mounted to the right of the shooting stations to throw targets transversely to the line of shooting and from the open side of a conventional trap house. This open side is the side away from the shooting station. However, if this arrangement were provided at the left-hand side of the shooting stations the near side of the trap house would be open, so that targets from the conventional trap might be thrown. With this arrangement considerable danger of injury to the trap attendant from stray shots would result unless some means were provided for closing off the exposed side of the trap house except at the instant at which the target was being thrown; such an arrangement requiring the use of trap doors or sliding closures which might be opened for the discharge of the target and immediately closed before the target would be shot at.

This invention provides a trap of simple and inexpensive construction which is adapted to throw either right-hand or left-hand targets and is adaptable for use not only for throwing targets in the usual manner in the line of flight of shooting but also for throwing targets transversely from either side of the line of shooting while requiring only the ordinary safety precaution of a simple three sided trap house having an open side positioned away from the line of shooting. The trap is of light weight which permits it to be carried easily from place to place, and is of simple and rugged construction which insures reliable operation over long periods of time with little or no attention for service or repairs.

The drawing, in which like characters of reference designate like parts throughout the several views thereof, illustrates such a trap. The trap comprises generally a frame 10 upon which the target throwing mechanism is mounted, a bracket member 12 upon which the frame is pivotally supported, and a base 14 which provides a pivotal support for the bracket member 12.

As shown, the base 14 is an integrally formed casting comprising a ring like bottom member 15 in which are provided screw holes 16 for the insertion of screws by which the trap may be attached to a suitable supporting foundation. Upwardly extending ribs 17 connect the portion 15 with a disk like portion 18 which is provided with an upturned circular face 19 and a concentrically positioned downwardly extending socket portion 20. The bracket 12 comprises a plate portion 22 having a downturned circular face 23 similar to the face 19, and a downwardly projecting stud 24 which is adapted to be received within the socket 20 of the base member. A tensioning device is provided to hold the bracket member 12 within the base 14 and a washer 26 formed of cork or other suitable material is positioned between the adjacent faces 19 and 23 to provide frictional resistance against relative movement between the bracket and base. The tensioning device comprises a stud 27 extending downwardly from the bracket portion 24 and provided with adjusting nuts 28 for the support of a spring 29 which is held between the nuts and a washer 30 which is of sufficient diameter to rest against the lower edge 31 of the base socket portion 20. By adjusting the nuts 28 the spring tension may be varied to control the frictional resistance to movement of the bracket and frame with respect to the base.

Pivotal movement on a vertical axis as provided between the frame of the trap and its supporting base by means of the pivot joint between the socket 20 and stud 29, permits the target throwing mechanism to be moved so that the targets may be thrown at varying angles to the line of shooting.

Limiting means are provided to restrict the angular travel of the trap frame to within the required movement of 54° now standard practice in "angle shooting." The limiting means comprise spaced lugs 32 preferably formed as an integral part of the base structure 14, and an extending tongue 33 which is formed as an integral part of the plate portion 22 of the bracket 12 and is positioned to be engaged, at the limits of predetermined travel, by the spaced stops 32. A set screw 35 is provided in the base 14 for locking the base to the bracket 12 when it is desired to throw the targets all in a single line of flight. As shown, the set screw 35 is positioned to engage the portion 24 of the bracket within a peripheral groove 36 provided thereon.

Attachment of the frame 10 to its supporting bracket 12 is provided by means of a pivotal connection comprising a vertically positioned plate member 37 which is shown formed as an integral part of the frame 10 beneath the loop portion 38. The member 37 has a circular face 39 and is adapted to contact with a similarly shaped member 40 of the bracket, and is attachable thereto by means of a bolt 41 which provides a horizontal pivotal axis about which the frame may move. Adjustment of the frame with respect to the bracket permits the targets to be thrown at varying angles with respect to the horizontal.

The frame 10, which preferably comprises a single integrally formed casting, is provided at one end with a bearing 42 within which a rotatably mounted shaft 43 is journalled. One end of the shaft 43 has fixed to it, as by means of a pin 44, a throwing arm 45 upon which a target carrier 46 is removably held as by means of screws 47. The opposite end of the shaft 43 has fixed to it an arm 50 which is positioned 180° with respect to the throwing arm 45 and is held to the shaft as by means of a pin 51. The outwardly extending end of the arm 50 carries a stud 52 in which is provided a ring like depression 53 for the support of one end of a spring 55. The spring 55, which passes freely through the loop portion 38 of the frame and may be tensioned for throwing the targets, is supported at its opposite end upon a threaded stud 56 which is carried by an extension 57 of the frame 10 and is provided with an adjusting nut 58 by which the spring tension may be adjusted. The frame portion 57 also carries a handle 59 which is provided for convenience in controlling the throwing angle of the trap.

The spring 55 is tensioned, and energy stored, when the throwing arm is swung back to the position shown for example in Fig. 4, where it is latched until the time of release of the target. The trap frame 10 is provided with a transversely positioned plate portion 60 upon which is positioned spaced screw holes 61 for the reception of a pivot screw 62 upon which a latch member 63 may be pivotally mounted. The latch member 63 is provided with a notch 64 which is adapted to engage and retain an end portion 65 of the throwing arm 45 when it is moved into cocked position against tension of the spring 55, and is provided with an extending tail portion 66 which is adapted to be engaged by the trigger member of the device. A spring 67, which is supported against an upstanding lug 68 of the portion 60, is provided to bear against the latch 63 and constantly urges the latch member toward latching position to maintain latched engagement with the throwing arm when cocked until the latching member is forcibly moved by actuation of the trigger member 70 for release of the throwing arm and discharge of the target. As shown, the trigger member 70 comprises an arm movable within a slot 71 provided in the trap frame 10 and pivotally supported upon a pin 72 which is fixed to the frame.

A target locating member is provided on the frame and, as shown, comprises a one piece member 74 fixed thereto by means of a single attaching screw 75. The member 74 is provided with a laterally extending finger 76 which, in cocked position of the throwing arm, is adapted to overlie the target carrier 46 and provide a locating means to aid in properly positioning a target, designated at 77, upon the carrier 46. The target carrier 46 is shown as comprising a plate portion 78 upon which the target is adapted to rest, and a guiding rail 79 which is spaced from the portion 78 as by means of lugs 80 in which are inserted screws 81 for the attachment of the rail. The finger 76 of the locating member is adapted to extend through the space between the plate portion 78 and the rail 79 of the carrier.

The throwing mechanism of the trap is so arranged that when it becomes desirable to throw left-hand targets instead of right-hand targets, or the reverse, the change can be easily and quickly made by merely reversing a few parts of the trap. As shown, the target carrier 46 is of symmetrical shape and may be readily reversed upon the throwing arm 45 by merely removing the attaching screws 47, turning the carrier 46 end for end, and replacing the attaching screws 47; the throwing arm and spring being movable in opposite directions without change. The throwing arm and associated target carrier may be held in cocked position on the left-hand side for throwing left-hand targets, as shown in Fig. 4, instead of to the right-hand side, as shown in Fig. 2 by merely changing the positioning of the latching means. The frame portion 60, as mentioned, is provided with a duplication of the screw hole 61 for reception of the latching member pivot screw 62 and also carries a second projection 68' for the support of the spring 67; the screw holes and projections 68—68' being symmetrically positioned to receive the latching means in either of opposite positions. The tail 66 of the latching member 63 is of sufficient length to engage the trigger member 70 when the latching member is mounted in either of the two mentioned positions. The locating member 76 may also be easily reversed by merely loosening the attaching screw 75 and turning the member end for end.

In operating the trap it is only necessary to grip the target carrier 46 and pull it around against the tension of the spring 55 until the end 65 of the throwing arm 45 is caught by the latch 63. A target may then be placed upon the carrier 46 and against the locating member 76. Upon actuating the trigger 70 either directly or by means of a pull on a release cord 85 attached to the trigger, the latch 63 will release the throwing arm whereupon it is swung by the tensioned spring 55 to throw the target in the usual manner.

It will now be apparent that a target trap of simple and sturdy construction is provided which comprises but a relatively few parts and which may be inexpensively manufactured. The trap is readily adaptable to either "angle shooting" or for the discharge of targets in a single line of flight. By the reversal of a few of the trap parts, which may be accomplished easily and in but a few moments time, the trap can be changed to throw either right-hand or left-hand targets.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a target trap, target throwing means, a reversibly mounted latch for said target throwing means, said means being adapted to be reversibly mounted so as to be cocked to engage said latch by movement in either of two directions to throw targets either in right-hand or left-hand directions when released.

2. In a target trap, target throwing means comprising a spring actuated throwing arm, an actuating spring therefor, and a target carrier reversibly mountable on said throwing arm to throw targets either in right-hand or left-hand directions.

3. A target trap comprising a throwing means, a pivotal support therefor, and a spring for operating said throwing means, said throwing means being movable to either side of the trap to throwing position and to store energy in the spring.

4. A target trap comprising a throwing means, a pivotal support therefor, and a spring for operating said throwing means, said throwing means being movable to either side of the trap to throwing position and to store energy in the spring, the throwing means having a reversibly connected throwing arm provided with a target guide whereby the target guide may be positioned on either side of the target.

5. In a target trap, a frame, target throwing means movably mounted on said frame, latching means for said target throwing means, said latching means being adapted to be reversibly mounted on said frame to receive said target throwing means in either right-hand or left-hand position.

6. In a target trap, a throwing arm movable to a right-hand or left-hand cocked position, a latch member engageable with an end portion of said throwing arm when in cocked position, means for supporting said latch member, and means symmetrically positioned and adapted to receive said supporting means in either of two positions for reverse mounting of said latch member.

7. In a target trap, target throwing means comprising a spring actuated throwing arm adapted to throw targets either in right-hand or left-hand directions, an actuating spring therefor, a symmetrically shaped target carrier, means for attaching said target carrier to said throwing arm, said means comprising spaced attaching screws adapted to receive said target carrier in reversed positions.

8. In a target trap, a frame, target throwing means comprising a spring actuated throwing arm, a target carrier mounted on said throwing arm, latching means for said target throwing means mounted on said frame and comprising a latch member and a spring therefor, said target carrier and latch means being reversibly mounted for cooperation in throwing targets in either right-hand or left-hand directions.

9. In a target trap, a frame, reversible target throwing means mounted thereon and adapted to throw targets either in right-hand or left-hand directions, latching means for said target throwing means, said latching means comprising a latch member, means for mounting said latch member on said frame, a spring for said latch member, said frame comprising symmetrically placed and oppositely positioned means for retaining said mounting means and spring to provide a reversible mounting for said latch member.

10. In a target trap, reversible target throwing means adapted to be reversely mounted and to be cocked to engage latching means by movement in either of two directions to throw targets either in right-hand or left-hand directions, reversibly mountable latching means therefor, and a trigger member adapted to actuate said latching means when the latching means is mounted in either of opposite positions.

11. In a target trap, reversible target throwing means adapted to be reversely mounted and to be cocked to engage latching means by movement in either of two directions to throw targets either in right-hand or left-hand directions, reversibly mountable latching means therefor, and a single trigger member pivotally mounted in a definite position, said trigger member being adapted to actuate said latching means when the latching means is mounted in either of opposite positions.

12. In a target trap, a frame, a target throwing mechanism reversibly mountable on said frame to throw targets either in right-hand or left-hand directions, a base for said frame, said base providing a pivotal support for said frame, means for frictionally retarding movement of the frame relative to the base, and means for positively limiting the angular travel of the frame with respect to the base.

13. In a target trap, a frame, a target throwing mechanism reversibly mountable on said frame to throw targets either in right-hand or left-hand directions, a frame bracket pivotally supporting said frame for movement on a horizontal axis, a base, said bracket being pivotally mounted on said base for movement about a vertical axis, and means for locking said bracket member to said base.

14. In a target trap, reversibly mountable target throwing means adapted to be moved in either direction to a cocked position to throw targets either in right-hand or left-hand directions, and a reversibly mountable target locating member associated with said target throwing means, said locating member when in one position cooperating with the throwing means when in cocked position for the throwing of targets in a right-hand direction, and when reversely mounted cooperating with the throwing means when in cocked position for the throwing of targets in a left-hand direction.

15. In a target trap, reversibly mountable target throwing means adapted to throw targets either in right-hand or left-hand directions and including a pivotally supported frame, and a reversibly mountable target locating member associated with said target throwing means, said target supporting member comprising a one piece finger attachable to said frame by means of a single attaching member.

16. In a target trap, a frame, reversible target throwing means mounted thereon and adapted to throw targets either in right-hand or left-hand directions, latching means for said target throwing means, said latching means being adapted to be reversibly mounted on said frame to receive said target throwing means in either of opposite positions, a single trigger member for actuating said latching means in either of opposite positions, and a reversibly mountable target supporting member on said frame.

17. In a target trap, a frame comprising an elongated part having a supporting arm depending from said part at a point near the center thereof and providing the sole support for said part, a mount for said arm, a target carrier pivoted at an end of said frame said target carrier having a target guide at one side thereof, a handle at the other end of said frame, a spring extending through the supporting arm position and connected at an end thereof to the said other end of the frame and connected at its opposite end to said target carrier and located just below the said elongated part, and latching and releasing means for said target carrier.

In testimony whereof I hereto affix my signature.

GEORGE W. LORIMER.